April 27, 1948.  E. H. ETGEN  2,440,502
AUXILIARY VEHICLE TRUCK
Filed April 17, 1947  3 Sheets-Sheet 1
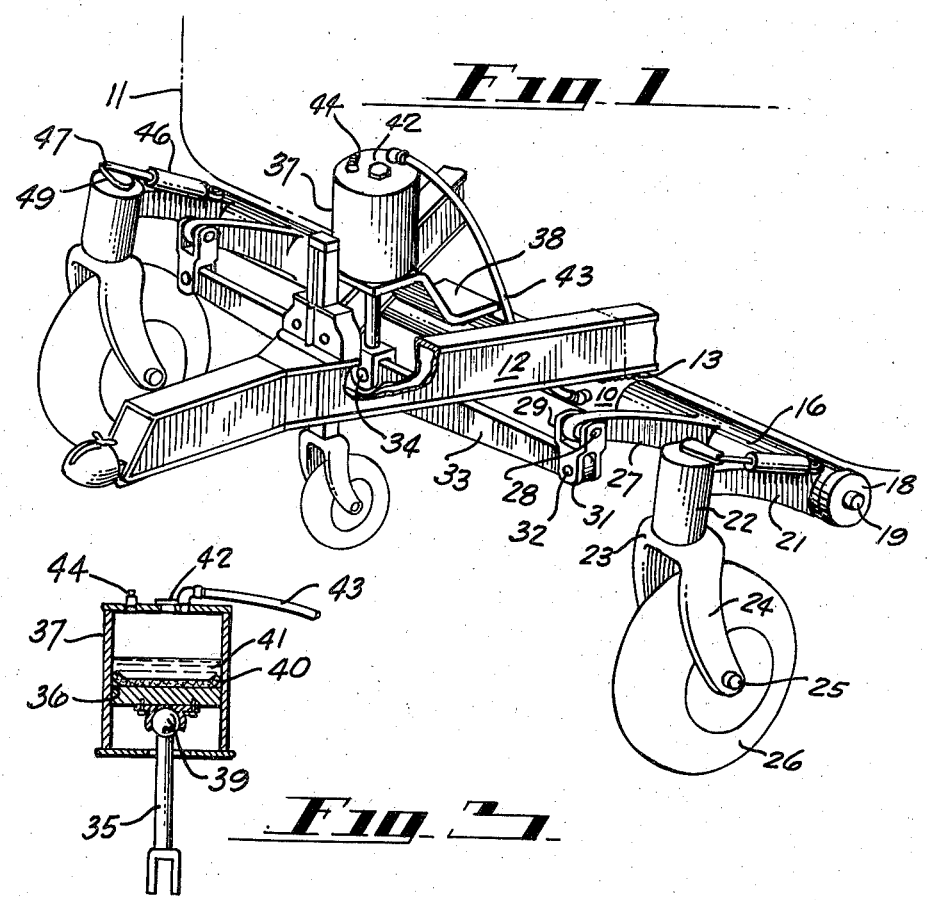
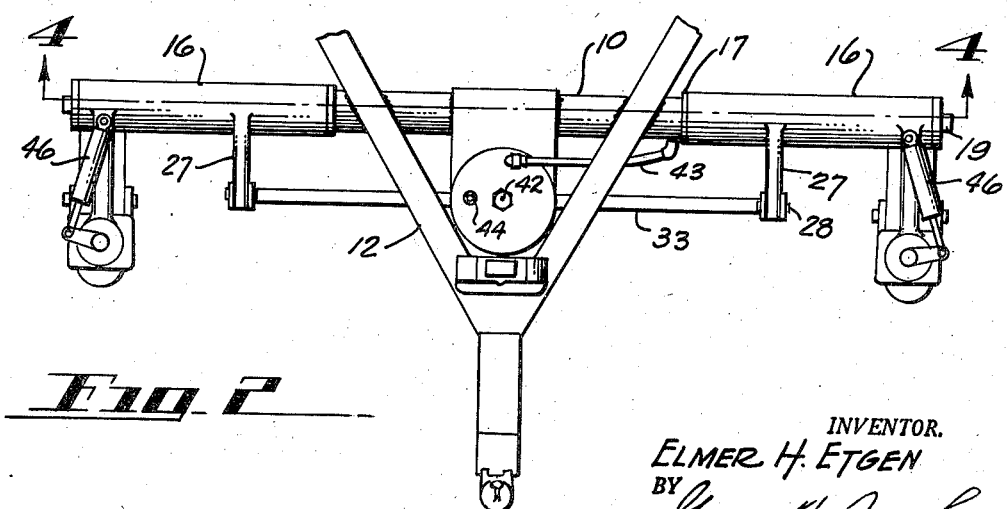
INVENTOR.
ELMER H. ETGEN
BY George T. Smyth
ATTORNEY April 27, 1948.                E. H. ETGEN                2,440,502
                          AUXILIARY VEHICLE TRUCK
                   Filed April 17, 1947        3 Sheets-Sheet 2
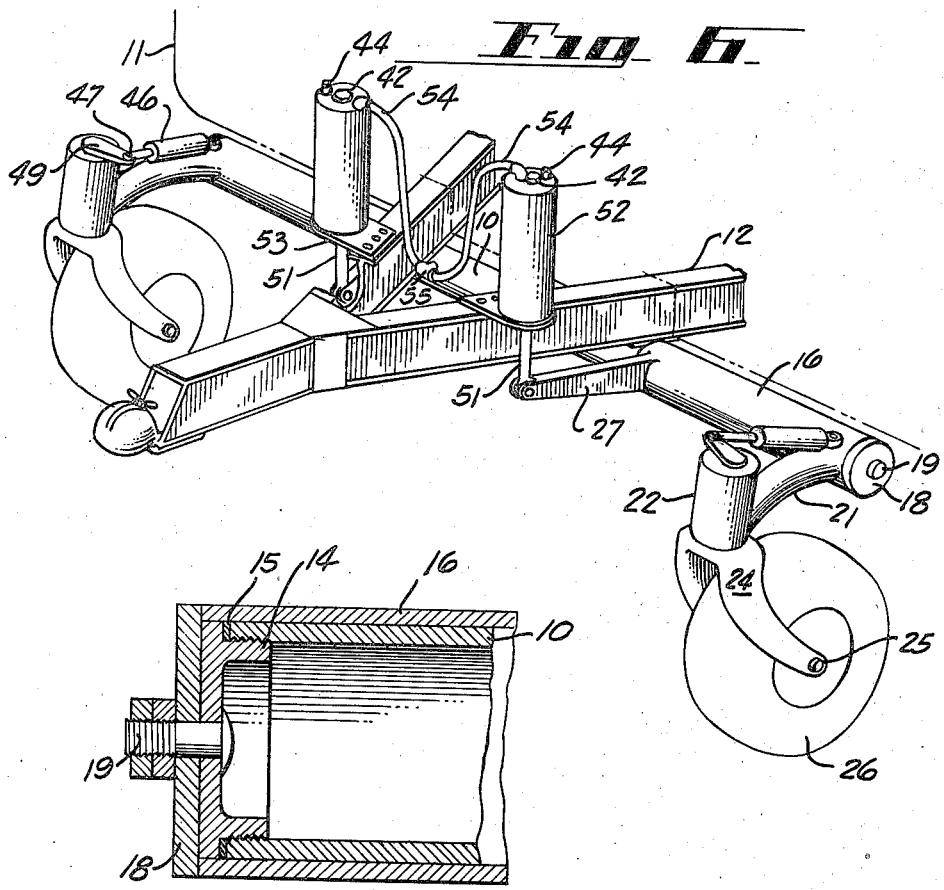
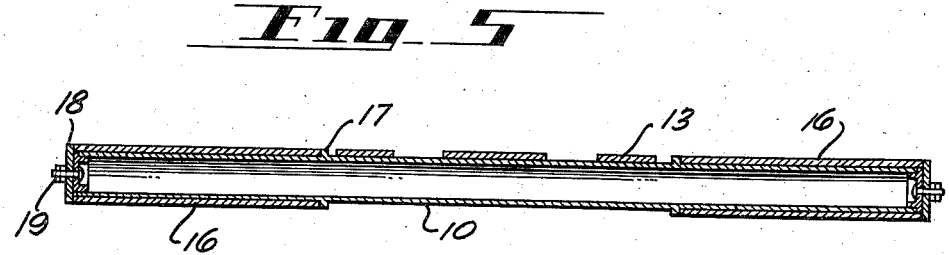
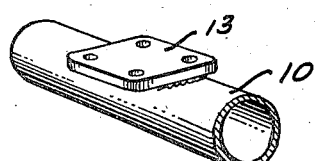
INVENTOR.
ELMER H. ETGEN
BY
George J. Smyth
ATTORNEY April 27, 1948.
E. H. ETGEN
2,440,502
AUXILIARY VEHICLE TRUCK
Filed April 17, 1947
3 Sheets-Sheet 3
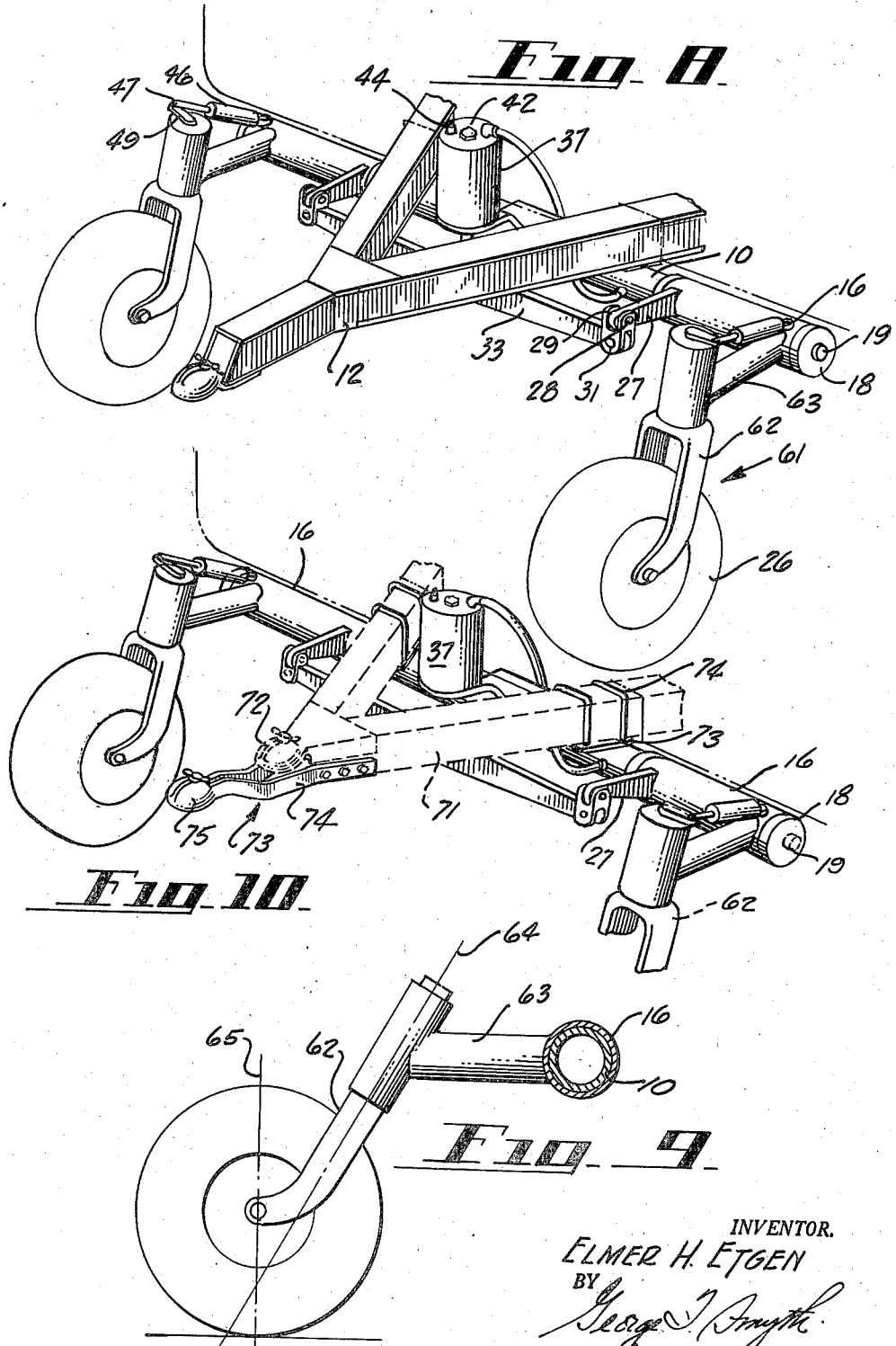
INVENTOR.
ELMER H. ETGEN
BY
George J. Smyth
ATTORNEY Patented Apr. 27, 1948

2,440,502

UNITED STATES PATENT OFFICE 2,440,502

AUXILIARY VEHICLE TRUCK

Elmer H. Etgen, Los Angeles, Calif.

Application April 17, 1947, Serial No. 742,022

19 Claims. (Cl. 280—124)

This invention relates to trucks or dollies and more particularly to a truck or dolly for supporting the front end of a trailer drawn by a draft vehicle.

The dolly of the present invention provides a truck for supporting the forward portion of a trailer and thus relieves the towing vehicle of a substantial part of the weight of the trailer. Trailers, particularly the so-called house trailers, are becoming increasingly heavy and tend to severely overload the rear portions of present day passenger vehicles. In many instances it has been found necessary to replace the original spring suspension means of the towing vehicle with heavier suspension means capable of taking the load imposed by the trailer. Although the heavier springs will take the loads imposed by the trailer they detract from the riding qualities of the towing vehicle particularly when disengaged from the trailer.

To obviate this difficulty it has been proposed to support the forward portion of the trailer by a wheeled truck or dolly having a coupling device for connecting the trailer to the towing vehicle. Many of the dollies previously proposed have been fitted with wheels so mounted that they were incapable of turning and for this reason made difficult conjoint backing of the trailer and towing vehicle.

Other trailer dollies heretofore proposed have been provided with castering wheels or at least wheels mounted for movement about a vertical axis which obviated much of the difficulties found with dollies having fixed wheels.

Another problem introduced by the adoption of the dollies previously proposed has been the difficulty in mounting the wheels of the same so that they could move vertically in opposite directions relative to each other when road obstacles were encountered. Various types of spring suspensions have been used but have been subject to a number of criticisms.

It was found where coil spring units were used to support the wheels of the dolly that the desired maximum movement of the wheels could only be had if the coil springs were relatively large. Too large a spring rendered the dolly objectionable to many trailer owners and efforts to reduce the size of the springs merely resulted in a reduction of the movement of wheels.

It has also been proposed to mount the castering wheel units to a dolly through a pair of articulated levers forming the castering arm of the unit, the levers being urged apart by a coil spring which resiliently supported the load carried by the dolly. This proposal was subject to the above mentioned criticism because of the use of the springs. In addition, as the lever to which the wheel was mounted was swung through varying arcs during travel of the vehicle the castering angle varied as the road surface varied and consequently the wheels tended to oscillate or "shimmy." This difficulty was also encountered where the wheels were mounted by leaf springs which formed the arm or lever of the castering wheel unit.

In all wheel installations where springs were used the pressure of the wheels against the ground or running surface increased as the wheels moved upwardly over obstacles and decreased as the wheels dropped into cavities or the like in the surface over which the wheels were run. These changes in the pressure of the wheels against the surface tended to increase the shock and resultant vibration in both the towing vehicle and trailer.

The difficulties experienced in dollies previously used are obviated by the present invention for the wheels of the dolly herein disclosed are suspended by means of a pneumatic unit which permits the desired vertical movement of the wheels and yet provides an adequate support for the trailer.

The suspension means of the present invention comprises in the broadest aspects thereof a cylindrical air reservoir which forms a transverse frame member of the dolly as well as an axle for the castering wheels for it supports at each end a rotatably mounted sleeve carrying the arm of the wheel unit. Movement of the sleeves is restrained and controlled by one or more pneumatic cylinders the pistons of which are operatively connected to the sleeves. Each cylinder is connected by a suitable air conduit to the reservoir so that air may be forced from a cylinder into the reservoir in response to movement of a wheel. Each piston therefore has full travel in its cylinder without materially increasing the pressure of the air in the system. Without an increase of the air pressure there is no increase of the pressure of the wheel against the ground which eliminates the vibration and shock to the trailer as would be had if spring suspension means were used.

Another advantage of the pneumatic suspension of the dolly of the present invention lies in the ease of adjustment of the load carrying factor of the dolly. This is done by merely changing the pressure of the air within the system and to this end a valve such as supplied with present day pneumatic tires is provided preferably on each cylinder.

The dolly of the present invention may be formed as part of the original equipment of a trailer or sold as an accessory to a trailer already in use. Where the dolly is formed as part of the original equipment the longitudinally extending frame members of the trailer should be extended forwardly to provide a longer hitch or draw bar than is ordinarily used. This is to provide clearance for the castering wheels of the dolly in all positions of the towing vehicle.

Where the dolly is sold as an accessory and to be mounted to a trailer already in use, an extension bar is used to provide the clearance desired. This bar should be one which will provide but one pivotal connection between the towing vehicle and the trailer to eliminate the difficulties had by reason of the movement arm created by a hitch having two pivotal connections.

Other features and advantages of the dolly of the present invention will be apparent from the following description taken in connection with the accompanying drawing in which:

Figure 1 is a perspective view of one embodiment of the dolly of the present invention showing the same mounted to a trailer a part of which is shown in unbroken lines and a part in broken lines;

Figure 2 is a top elevational view of the dolly shown in Figure 1;

Figure 3 is a vertical section taken through the cylinder and piston of the suspension means of the dolly;

Figure 4 is a section taken along line 4—4 of Figure 2;

Figure 5 is a fragmentary view in section of an end of the cylindrical frame member of the dolly forming the reservoir of the pneumatic suspension system;

Figure 6 is a view similar to Figure 1 but showing a modified form of the dolly of the invention;

Figure 7 is a fragmentary view of the cylindrical frame member showing the plate used to secure the dolly to the frame of the trailer;

Figure 8 is a view similar to Figure 1 but showing another embodiment of the dolly of the present invention;

Figure 9 is a side elevational view of the caster wheel of the form of the dolly shown in Figure 8; and Figure 10 is a perspective view of one embodiment of the dolly of the present invention mounted to a trailer as an accessory and showing the extension member fixed to the original hitch of the trailer, the trailer being shown in broken lines.

The dolly of the present invention in the one embodiment illustrated comprises, referring now to Figure 1 of the drawing, a tubular frame member 10 adapted to be transversely mounted at the front end of a trailer 11. The tubular frame member 10 is to be secured to the frame members 12 of the trailer and may, if desired, be secured in position by directly welding the same to the frame members 12. If found desirable a pair of apertured plates 13, as best shown in Figure 7, may be welded or otherwise secured to the tubular member 10, which plates may in turn be welded to the trailer frame members 12 or secured to the latter by bolts or other suitable fastening means.

It will be seen, referring now to Figure 5, that each end of the tubular member 10 is closed by a flanged cap 14 threaded into the member to tightly clamp a gasket 15 between the flange thereof and the annular end face of the tubular member 10. It should be noted that the diameter of the flange of the cap is substantially the same as the outer diameter of the tubular member 10.

A sleeve 16 is telescopically mounted for rotational movement on each end of the tubular member 10 and is held against inward movement by collars 17 carried by the frame member 10. Although the collars 17 are illustrated as integral with the member 10 obviously they could be formed separately therefrom and then welded or otherwise secured in position thereon.

To hold the sleeves 16 against outward movement, a circular plate 18 is fixed to each cap 14 by means of a bolt or threaded stud 19 centrally carried by the latter. The diameter of the plates is as large as or larger than the outer diameter of the sleeves 16 and prevents outward movement of the same while permitting free rotational movement thereof.

Each sleeve 16 is provided at the outer end thereof with an arm 21 which carries at the free end thereof a suitable bearing 22 for receiving a spindle or king pin, not shown, projecting upwardly from a yoke or fork 23. The yoke 23 is formed with a pair of curved arms 24 supporting an axle 25 carrying a wheel 26. As the spindle of the yoke is freely rotatable in the bearing 22 the wheel 26 is free to caster.

The wheels, fitted with suitable pneumatic tires, support the forward end of the trailer through a suitable suspension unit which in the form of the invention illustrated in Figure 1 comprises an arm 27 projecting outwardly from the inner end of each sleeve 16. The free end of each arm 27 rotatably receives a pin 28 of a clevis 29 which carries a downwardly opening second clevis 31, the pin 32 of which extends substantially normal to the pin 28 of the clevis 29. The pins 32 are rotatably carried by the opposite ends of a lever 33 mounted by means of a suitable pin 34 to the bifurcated lower end of a rod 35 projecting downwardly from a piston 36 operating in a cylinder 37. The cylinder is supported by a bracket 38, welded or otherwise secured to the tubular frame member 10.

The rod 35 is connected to the piston 36 by a ball and socket connection member 39 so that the rod may rock or pivot slightly relative to the piston 36. The lower wall of the cylinder as well as the bracket 38 are formed with aligned apertures somewhat larger than the diameter of the rod 35 to permit the rocking or pivotal motion of the rod.

The upper end of the cylinder must be airtight and to prevent leakage of air around the piston some means must be provided for sealing the annular space between the piston and the cylinder. This means may comprise a packing 40 carried by the upper face of the piston although any means adapted for the purpose may be used. Where the packing 40 is used I have found that a quantity of oil such as indicated at 41 increases the efficiency of the packing 40 and serves also to lubricate the wall of the cylinder. To replenish the oil 41, an aperture may be provided in the top wall of the cylinder to permit a supply of oil to be dropped into the cylinder. The aperture can be closed by some suitable closure means such as a threaded plug 42 fitted with a gasket for sealing the closure effected by the plug.

The upper end of the cylinder is connected by a flexible hollow conduit 43 to the tubular frame member 10 to the end that the cylinder is in communication with the interior of said member. The member 10 besides serving as a frame member as herebefore explained also forms a reservoir which will receive air forced from the cylinder due to movement of the wheels over road hazards.

To permit the air pressure within the system to be regulated, the cylinder 37 carries a pneumatic valve 44 such as supplied with inner tubes of present day pneumatic tires. When it is desired to replenish air lost by leakage or to increase the pressure of the air within the system it is only necessary to introduce air into the cylinder through the valve 44 either by means of a pump or through the usual air supply to be found in all modern garages and service stations.

It will now be seen that as the sleeves 16 are rotatably carried by the opposite ends of the tubular frame member 10 the latter forms an axle about which the wheels 26 are free to arcuately move vertically as the trailer is drawn over an uneven surface. Movement of the sleeves 16 and consequently the wheels 26 is resisted by the cylinder and piston through the linkage mechanism comprising the interconnected lever 33 and arms 27.

It will be seen that the wheels may move arcuately about the axis of the frame member 10 to accommodate any road condition which might be encountered. As the air under pressure in the system is actually carrying the load of the trailer in all positions of the wheels road shocks are cushioned and absorbed by the air.

In use with the trailer resting on a substantially level surface the wheels will assume a position relative to the sleeves 16 somewhat as shown in Figure 1 depending on the pressure of the air within the cylinder 37 and reservoir formed by the member 10. Now should the trailer be drawn over an elevated road hazard extending across the track of the trailer both wheels will be forced upwardly and the sleeves will be rotated in a clockwise direction to swing both arms in the same direction. This movement of the arms 27 will draw the lever 33 upwardly and thus urge the rod 35 and the piston 36 upwardly as viewed in Figure 1.

It should be seen that the wheel suspension system of the present invention permits the wheels to arcuately move vertically a relatively large distance without the necessity of employing a relatively large cylinder. This feature is brought about as the piston is free to move substantially the entire length of the cylinder. In previously proposed dollies in which coil spring units were used the wheels could move only that distance permitted by compression of the spring. As a coil spring can only be compressed to a length generally in the neighborhood of half its normal length, a given cylinder length in the dolly herein disclosed will permit a relatively larger wheel movement than a coil spring of the same length. This feature of the dolly of the present invention in addition to obviating structural disadvantages found in spring units, also enhances the appearance of the dolly for the relatively large and bulky spring units of prior dollies rendered such dollies objectionable to many trailer owners.

As will be understood the compressed air within the system cushions the trailer in that jars and shocks caused by traveling over rough surfaced roads are absorbed and in part taken up by the air cushion in effect formed between the stationary and movable parts of the system. The air under pressure will be slightly compressed as it is forced out of the cylinder through the conduit 43 and into the member 10 but yet the reaction force urging the wheels against the surface will not be materially increased. As the reaction force does not materially increase as the wheels swing upwardly, as would be the case where spring suspension units were used, the resultant shock to the dolly and trailer are eliminated.

If the trailer should be drawn over a road hazard which results in upward movement of one wheel and downward movement of the other, the upwardly moving arm 27 will draw one end of the beam 33 upwardly as the downwardly moving arm 27 forces the other end of the beam downwardly to cause the beam to rock about the pin 34. This relative movement of the wheels may be such that little or no movement of the piston will occur. On the other hand should one wheel move either downwardly or upwardly and the other remain in its normal running position, the piston will be moved relative to the cylinder in accordance with the movement of the moving wheel.

It should be noted that the wheels 26 are carried by the dolly at the opposite sides thereof and the dolly is of such a size that the wheels thereof will travel over the road in the same tracks as the draft vehicle and trailer. Thus any road hazard such as an irregularity in the road surface which can be spanned by the draft vehicle can be spanned by the dolly.

As the wheels are free to caster the trailer will easily follow a turn of the towing vehicle. This facilitates backing of the trailer as should be understood. The caster wheels further tend to eliminate road shocks to the trailer caused by certain road hazards as the wheels are free to turn and accommodate the irregularities in the surface of the road.

To reduce oscillation or shimmying of the wheels due to road conditions imposing lateral thrusts against the same, the axis of the spindles or king pins of the caster wheels have been rearwardly inclined at a small angle to the vertical. This position of the spindles has been found to greatly reduce shimmy under normal road conditions.

It has been found advisable to obviate the possibility of shimmy under abnormal road conditions to provide a dampening device for each wheel. This device may comprise a conventional hydraulic shock absorbing member 46 having one end connected by means of a suitable pivot pin 47 to the one end of a link or lever 49, the opposite end of which is fixed to the upper end of the spindle or king pin of the caster wheel. The opposite end of the shock absorbing member 46 is pivotally secured to the sleeve 16 or the arm 21.

The shock absorbing member just described will effectively damp out any oscillations of each caster wheel but yet will allow each wheel to find its own course and caster freely when necessary. It is obvious that means other than a hydraulic shock absorbing member can be used to damp out undesirable oscillations of the wheels.

In the form of the invention shown in Figure 6 in which elements identical to those illustrated in the form of the invention shown in the earlier described figures have been given the same reference characters, the walking beam 33 and the clevises forming the pivotal connections between the beam and the arms 27 have been substituted for direct pivotal connections between the free end of each arm 27 and a rod 51 of a piston, such as piston 36, operating in a cylinder 52. Each of the two cylinders 52 is somewhat smaller in size than the single cylinder 37 of the previously described embodiment of the invention.

Each rod 51 is connected to its piston through a suitable universal joint to permit some rocking movement of the rod relative to the piston and cylinder. The cylinders 52 are carried or supported by brackets 53 bolted or otherwise securely fixed to the frame members 12 of the trailer.

A conduit 54 leads from each cylinder 52 to a T connection 55 carried by the cylindrical frame member 10 which, as in the earlier described form of the invention is a sealed member capable of serving as an air reservoir. The interiors of the cylinders are thus not only in communication with the interior of the member 10 but with each other as well.

A pneumatic valve is carried by the top wall of each cylinder 52 and serves the same purpose as the pneumatic valve 44 of the earlier described form of the invention. A filler plug such as the plug 42 closes an opening in the top wall of the cylinder for replenishing oil within the cylinder for augmenting the seal effected by the packing carried by the piston.

It will be seen from this embodiment of the invention that the vertical movement of each wheel will be transmitted by means of the sleeves 16 and the arms 27 through the rods 51 to the pistons operating in the cylinders 52. The interiors of the two cylinders are connected to the air reservoir formed by the frame member 10 so that air forced from either cylinder 52 by movement upwardly of the wheels about the axis of the frame member 10 will flow through the conduit 54 connected into the reservoir formed by the frame member.

As the volume of air held by this reservoir is large relative to the volume of air above a piston very little compression of the air in the system is had even though both wheels of the dolly simultaneously move upwardly over an obstacle on the road. Thus as in the earlier described embodiment of the dolly the load pressure on each wheel remains substantially constant regardless of the position of the wheels. As has been previously explained this reduces vibration in the trailer for the load is more uniformly distributed over the wheels of the dolly even though the trailer is being drawn over an uneven surface.

An anti-shimmy device such as illustrated as used in the form of the dolly shown in Figure 1 is also used in this embodiment to damp out undesirable oscillations of the castering wheels. Here again other dampening means could be used if desired.

It should be seen that the last described embodiment of the dolly of the present invention has the features enumerated for the earlier described form of the dolly.

There is shown in Figure 8 a still further modified embodiment of the invention, and elements to be found in this embodiment identical to those shown in the form of the invention illustrated in Figures 1 through 5 have been given like reference characters.

In this form of the invention the castering wheel assembly 61 comprises a bifurcated wheel-carrying member 62 supported by an arm 63 carried by the sleeve 16. The bifurcated wheel-carrying member 62 is mounted for rotation about an axis indicated at 64 which is oblique to the vertical. It will be seen that the axis 64 intersects a vertical line 65 passing through the center of the wheel at a point spaced above the surface engaged by the wheel, and that this axis engages the wheel-engaging surface at a point located forwardly of the vertical line passing through the center of the wheel. It will thus be seen that in this form of the invention the castering wheels are mounted in substantially the same manner as is the front wheel of a conventional bicycle.

As in the form of the dolly shown in Figures 1 and 2 the rotatably oscillatory sleeves 16 are formed with arms 27 pivotally connected by clevis members 29 and 31 to a beam 33 pivotally connected intermediate its ends to the lower end of a connecting rod fixed to a piston moving in a centrally disposed cylinder 37.

In this form of the invention as in those earlier described, the load is in effect carried by the air cushion which also absorbs road shocks as well as uniformly distributes the load of the forward portion of the trailer evenly between the two wheels of the dolly.

In all forms of the present invention heretofore described the dolly has been incorporated as an original part of a trailer. The invention is not to be limited to such an installation for the dolly of the present invention may be later installed on a trailer in use as an accessory. There is shown in Figure 10 one means or expedient which can be used to adapt any embodiment of the dolly of the present invention herein shown to trailers previously sold. In the figure referred to the forwardly extending frame members of a trailer chassis are indicated at 71 and the usual socket member for receiving the ball fixed to the rear of the towing vehicle is shown at 72.

As the caster wheels of the dolly require an increased clearance between the trailer and the towing vehicle, an extension bar or hitch 73 is fitted to the V-shaped forward extremity of the trailer frame. This extension bar or hitch is shaped to conform to the trailer frame and is preferably formed by a casting operation. The diverging arms of the extension bar are formed as angle members 74, the vertical flanges of which may be securely bolted to the side faces of the frame members of the trailer. The extension bar is of such a length that when the socket 75 carried by the forward end of the same is locked in position around the ball carried by the towing vehicle sufficient clearance is provided for 360° movement of the castering wheels as well as providing clearance between the castering wheels and the rear portion of the towing vehicle in all relative positions of the latter.

It should be noted that the socket member supplied with the trailer and originally used to form a part of the connection between the trailer and the towing vehicle is not used when the extension bar is secured in place to the frame member of the trailer. Thus only one universal connection is had when the socket 75 is locked about the ball carried by the towing vehicle. This obviates the difficulties had with previous dollies which utilized the socket carried by the chassis of the trailer to secure the latter to the dolly and the socket furnished with the dolly to secure the same to the towing vehicle. The articulated linkage formed by the chassis of the towing vehicle, the two ball-and-socket connections and the chassis of the trailer would remain in alignment in such dollies as long as the trailer was being drawn by the towing vehicle but the possibility that the linkage would jackknife, either horizontally or vertically, was great as soon as any compression forces were exerted on the hitch. This rendered it extremely difficult if not impossible to back the trailer by the towing vehicle but more serious yet was the result had when the brakes of the towing vehicle were applied suddenly and relatively heavy compression forces were exerted on the linkage.

As shown in Figure 10 the dolly is furnished with apertured plates 73 welded or otherwise securely fixed to the tubular frame member 10. The dolly may be secured to the frame members 71 of the trailer by passing U-bolts 74 around the latter and securely fastening the bolts through the apertures of the plate 73. It will thus be seen that the dolly can be quickly and easily secured to a trailer without the use of special tools or equipment. The only modification necessary to the trailer is the forming of the bolt-receiving openings in the forwardly extending frame members of the trailer for mounting the extension bar 73.

Whether the dolly of the present invention is subsequently mounted to a trailer or incorporated into a trailer as original equipment, the dolly forms a ground engaging, load-carrying member which will remove the weight of the trailer from the rear of the towing vehicle. Other advantages specifically brought out during the description of the various forms of the dolly of the present invention are in most instances to be had in all forms of the dolly.

Although the now preferred embodiments of the present invention have been illustrated and described herein, it is to be understood that the invention is not to be limited thereto and is susceptible to changes in form and detail within the scope of the appended claims.

I claim:

1. A vehicle truck, including: a hollow, frame member constituting a pneumatic reservoir and adapted to be attached transversely to the forward end of the vehicle; a ground-wheel support rotatably mounted on each end of said member for arcuately-vertical rotation; a ground-engaging wheel carried by each support; and pneumatic cylinder-and-piston means disposed intermediate the ends of said member, and having a volume less than that of said reservoir and motion-connected by its piston means to each of said wheel supports and flow-connected by its cylinder means to said reservoir, whereby to maintain substantially equal the load pressure on each wheel, thereby minimizing lateral and vertical oscillations of the vehicle.

2. A vehicle truck, including: a hollow frame member constituting a pneumatic reservoir and adapted to be attached transversely to the forward end of the vehicle; a ground-wheel support rotatably mounted on each end of said member for arcuately-vertical rotation; a ground-engaging wheel carried by each support; and pneumatic cylinder-and-piston means disposed intermediate the ends of said member and substantially mediately of the vehicle and having a pneumatic volume less than that of said reservoir and having its piston-means motion-connected to each of said rotatable wheel supports and its cylinder means flow-connected to said reservoir, whereby to transmit road-shocks laterally inwardly from each end of the truck and absorb, transversely-centrally of the vehicle and in small compass, road-shocks effecting relatively large vertical movements of said wheels while maintaining the load pressure and reaction substantially equal on each wheel, thereby minimizing lateral and vertical oscillations of the vehicle.

3. A vehicle ground-gear unit, including: an elongate hollow frame member attachable transversely to the vehicle frame and adapted to serve as a pneumatic receiver and reservoir; a ground-wheel unit, including a ground-engaging wheel, movably mounted on each end of said frame member for arcuately-vertical oscillation therearound; and pneumatic shock-energy receiving and dissipating means operatively interposed between said wheel-units and said frame member and having its output-end fluid-flow connected to said pneumatic receiver and reservoir and its force-input end pivotally connected to said wheel-units in such geometrical relationship as to vibrationlessly absorb road-shocks from all the wheel-units and suspend the vehicle on the air of said pneumatic means and of said wheel units.

4. A ground-gear unit, including: a hollow, tubular, hermetically-sealed frame and axle member; means for enabling connection of said member transversely across the front end of an auxiliary vehicle; a wheel support rotatably mounted on each end of said tubular member for arcuately-vertical movement in a plane parallel to the longitudinal axis of the vehicle; a ground engaging wheel mounted on each support; and pneumatic cylinder-and-piston means disposed intermediate the ends of said tubular member and having a pneumatic volume less than that of said tubular member and having its piston-means motion-connected to each of said rotatable wheel-supports and its cylinder-means flow-connected to said tubular member, whereby to enable permanent or temporary attachment of said unit to an unstable auxiliary vehicle requiring running and standing support to convert said vehicle into an independent one capable of running stably and vibrationlessly substantially free of lateral shock and vibration.

5. An auxiliary-vehicle truck, including: a hollow transverse frame member constituting a pneumatic reservoir and adapted to be attached to the forward end of said vehicle; a sleeve telescopically and rotatably mounted on each end of said member; a ground-engaging wheel supported at the outer end of each of said sleeves for arcuate vertical displacement; pneumatic cylinder-and-piston means supported mediately of said member, said reservoir having a pneumatic volume considerably greater than that of said cylinder-means; motion-transmitting means extending forwardly from the inner end of each of said sleeves; a connection between each of the last-said means and the outer end of said piston-means; and a flow-connection between the opposite end of said cylinder-means and said reservoir, whereby to maintain the load pressure and reaction substantially equal on each wheel and minimize lateral as well as vertical shocks and oscillations of the vehicle.

6. A vehicle truck, including: a hollow, frame member constituting a pneumatic reservoir and adapted to be attached transversely to the forward end of the vehicle; a ground-wheel support rotatably mounted on each end of said member for arcuately-vertical rotation; a ground-engaging wheel carried by each support; and means for absorbing differential vertical movements of said wheels due to differential road-shocks thereon and including vertically disposed pneumatic piston-and-cylinder means mounted intermediate the ends of said member, motion-transmitting arms extending forwardly from the inner end of each of said rotatable supports, said piston-means being pivotally connected to the forward end of each of said arms at stations, and through means, permitting differential transmission thereto of differential road-reactions from each wheel, said cylinder-means being connected to said reservoir to commonly receive, dissipate and substantially equalize said differential road shocks.

7. In a vehicle ground-gear unit, a transversely extending frame-member also constituting a pneumatic reservoir; a sleeve telescopically and rotatably mounted on each end of said member; a ground-wheel supported by each sleeve; a pneumatic shock-absorbing cylinder vertically mounted on said axle and flow-connected to said reservoir, and including a downwardly-depending force-receiving member; a forwardly-extending arm on the inner end of each of said sleeves for transmitting vertical ground impacts onwardly towards said force-receiving member; and a walking-beam pivotally connected near its medial portion to said force-receiving member and pivotally connected at its extremities to said arms, whereby to pneumatically accommodate differential road-impacts on the respective wheels and maintain the road pressure and reaction thereof substantially equal.

8. In a vehicle ground-gear unit, laterally spaced ground wheels; transversely-extending frame-member forming a pneumatic reservoir, a sleeve telescopically and rotatably mounted on each end of said member; a ground-wheel supported by each sleeve; a pair of vertically disposed, laterally spaced pneumatic cylinders mounted intermediate the ends of said member and flow-connected to said reservoir, each cylinder including a downwardly-depending force-receiving member; a forwardly-extending arm on the inner end of each sleeve; and a pivotal connection between the outer end of each arm and the lower end of the corresponding force-receiving member, whereby to enable excessive loads imposed on one of said cylinders to be pneumatically accommodated by said reservoir and absorb differential road-impacts on the respective wheels and maintain the road-pressure and reaction thereof substantially equal.

9. A vehicle ground-supporting and running gear comprising a frame member adapted to be transversely mounted to a vehicle and forming an axle for the ground-engaging wheels of said gear; a sleeve rotatably mounted on each end of said axle; an arm extending forwardly from near the outer end of each sleeve; a ground-engaging wheel supported by the free end of each arm; a single piston-and-cylinder pneumatic shock-absorbing device mounted on said axle intermediate its ends to extend substantially vertically; an arm extending forwardly from another location on each of said sleeves; a link extending transversely below the last said arms and below said pneumatic device; pivotal connections between the ends of said link and the forward extremities of said last named arms; and a pivotal connection between the lower end of said piston and the median point of said link.

10. In a vehicle ground-supporting and running gear, spaced ground-engaging units; a double-ended axle therefor; a sleeve rotatably mounted on each end of said axle; an arm extending forwardly from near the outer end of each sleeve to a portion of the adjacent ground-engaging element; a pair of piston-and-cylinder pneumatic shock-absorbing devices mounted in laterally spaced, vertically extending relationship on the vehicle frame forward of said axle; an arm extending forwardly from the inner end of each of said sleeves; and a pivotal connection between the outer end of each arm and the lower end of each piston, whereby to accommodate and absorb differential vertical road impacts imposed upon said ground-engaging elements.

11. An auxiliary-vehicle truck, including: a hollow transverse frame member constituting a pneumatic reservoir and adapted to be attached to the forward end of said vehicle; a sleeve telescopically and rotatably mounted on each end of said member; a ground-engaging wheel supported at the outer end of each of said sleeves for arcuate vertical displacement; a cylinder mounted intermediate the ends of said frame member; a piston operating in said cylinder; a rod having one end articulated to said piston; a beam; means for pivotally connecting the free end of said rod to said beam intermediate the ends thereof; means for pivotally connecting the opposite ends of said beam to said sleeves; and means connecting the interior of said cylinder to said reservoir to constitute the so interconnected cylinder and reservoir a closed pneumatic system in which air may be maintained at an elevated pressure.

12. A ground-gear unit for converting unstable incomplete trailer vehicles requiring standing and running support into independent, complete vehicles capable of running and standing on said gear in a laterally and longitudinally stable condition, comprising: a frame member; means for attaching said frame member to the forward portion of a trailer vehicle so as to extend transversely thereof; a sleeve telescopically mounted for rotation at each end of said frame member; a forwardly projecting arm carried by the outer end of each of said sleeves; a ground-engaging caster wheel carried by and disposed beneath the outer end of each arm; and means for yieldably holding said sleeves against rotation whereby arcuate movement of said wheels about the axes of said sleeves is yieldably resisted as said wheels engage irregularities in the surface over which said vehicle is drawn.

13. A ground-gear unit for converting unstable incomplete trailer vehicles requiring standing and running support into independent, complete vehicles capable of running and standing on said gear in a laterally and longitudinally stable condition, comprising: a frame member; means for attaching said frame member to the forward portion of a trailer vehicle so as to extend transversely thereof; a sleeve telescopically mounted for rotation at each end of said frame member; a forwardly projecting arm carried by the outer end of each of said sleeves; a pair of ground engaging caster wheels; means carried by the outer end of each arm for supporting a caster wheel for castering turning movement about an axis inclined rearwardly to the vertical; and means for yieldably holding said sleeves against rotation whereby arcuate movement of said wheels about the axes of said sleeves is yieldably resisted as said wheels engage irregularities in the surface over which said vehicle is drawn.

14. A ground-gear unit for converting unstable incomplete trailer vehicles requiring standing and running support into independent, complete vehicles capable of running and standing on said gear in a laterally and longitudinally stable condition, comprising: a frame member; means for attaching said frame member to the forward portion of a trailer vehicle so as to extend transversely thereof; a sleeve telescopically mounted for rotation at each end of said frame member; a forwardly projecting arm carried by the outer end of each of said sleeves; a pair of ground-engaging caster wheels; means carried by the outer end of each arm for supporting a caster wheel for castering turning movement about an axis inclined rearwardly to the vertical; means for yieldably holding said sleeves against rotation whereby arcute movement of said wheels about the axes of said sleeves is yieldably resisted as said wheels engage irregularities in the surface over which said vehicle is drawn; and means for resisting turning movements of said caster wheels about said inclined axes for damping oscillations of said caster wheels.

15. A ground-gear unit for converting unstable incomplete trailer vehicles requiring standing and running support into independent, complete vehicles capable of running and standing on said gear in a laterally and longitudinally stable condition, comprising: a frame member; means for attaching said frame member to the forward portion of a trailer vehicle so as to extend transversely thereof; a pair of caster wheel units, each wheel unit including a normally trailing wheel-carrying yoke, a spindle and a bearing for rotatably supporting said spindle so as to extend upwardly and rearwardly from said yoke; means carried at each end of said frame member for mounting one of said bearings for arcuate movement about the longitudinal axis of said transversely extending frame member; and means for yieldably resisting said arcuate movement of said bearings whereby said caster wheels are held in engagement with the surface over which said vehicle is drawn and cooperate with said last named means for yieldably supporting the forward portion of said vehicle.

16. A ground-gear unit for converting unstable incomplete trailer vehicles requiring standing and running support into independent, complete vehicles capable of running and standing on said gear in a laterally and longitudinally stable condition, comprising: a frame member; means for attaching said frame member to the forward portion of a trailer vehicle so as to extend transversely thereof; a pair of caster wheel units, each wheel unit including a wheel carrying yoke normally projecting forwardly, a spindle and a bearing for supporting said spindle for turning movement about an axis inclined to the vertical and intersecting a vertical line passing through the center of the wheel at a point spaced above the surface engaged by the wheel, said axis intersecting said surface at a point located forwardly of the intersection of the vertical line passing through the center of the wheel and said surface; means carried at each end of said frame member for mounting one of said bearings for arcuate movement about the longitudinal axis of said transversely extending frame member; and means for yieldably resisting said arcuate movement of said bearings whereby said caster wheels are held in engagement with the surface over which said vehicle is drawn and cooperate with said last named means for yieldably supporting the forward portion of said vehicle.

17. In a vehicle-truck of the nature described: a pair of ground-engaging wheels; a transverse frame-member dually constituting a double-ended axle for supporting said ground wheels and a pneumatic reservoir; means for mounting said wheels on said axle, said means including an elongate sleeve telescopically and rotatably mounted on each end of said axle; means for restraining movement of said sleeves longitudinally of said axle; a pair of pneumatic cylinders; a piston operating in each cylinder; means connecting said cylinders to said axle and establishing an air passageway between the former and the reservoir formed by the latter; means for maintaining the pressure of the air within said cylinders and reservoir at a desired elevated value; and means for connecting a piston to each sleeve for conjoint movement therewith whereby the air under pressure yieldably resists rotational movement of said sleeves.

18. A ground-gear unit for converting unstable incomplete trailer vehicles requiring standing and running support into independent, complete vehicles capable of running and standing on said gear in a laterally and longitudinally stable condition, comprising: an elongate, hollow frame member; means for hermetically sealing said member; means for attaching said frame member to the forward portion of said vehicle so as to extend transversely thereof; a sleeve telescopically mounted for rotation at each end of said frame member; a forwardly projecting arm carried by the outer end of each sleeve; a ground engaging caster wheel supported by the outer end of each arm for turning movement about a substantially vertical axis; an arm carried by the inner end of each sleeve and projecting forwardly therefrom; a pair of pneumatic cylinders; means for supporting said cylinders intermediate the ends of said frame member; a piston operating in each cylinder; a rod connected to each piston and projecting downwardly therefrom, means for pivotally interconnecting the free ends of said rods to the free ends of said last named arms; and means connecting the interiors of said cylinders to each other and to the interior of said frame member.

19. A ground-gear unit for converting unstable incomplete trailer vehicles requiring standing and running support into independent, complete vehicles capable of running and standing on said gear in a laterally and longitudinally stable condition, comprising: an elongate, hollow frame member; means for hermetically sealing said member; means for attaching said frame member to the forward portion of said vehicle so as to extend transversely thereof; a sleeve telescopically mounted for rotation at each end of said frame member; a forwardly projecting arm carried by the outer end of each sleeve; a ground engaging caster wheel supported by the outer end of each arm for turning movement about a substantially vertical axis; an arm carried by the inner end of each sleeve and projecting forwardly therefrom; a pneumatic cylinder; a piston operating therein; means interconnecting the interior of said cylinder and the interior of said frame member which forms a reservoir communicating with said cylinder; a rod connected to and projecting downwardly from said piston; an elongate lever; means for pivotally connecting the free end of said rod to said lever intermediate the ends thereof; and means for pivotally interconnecting the outer ends of said lever to the adjacent free ends of said last named arms.

ELMER H. ETGEN.